United States Patent
Sakata et al.

(10) Patent No.: US 11,919,397 B2
(45) Date of Patent: Mar. 5, 2024

(54) STRUCTURE OF VEHICLE BODY

(71) Applicants: TOYOTA JIDOSHA KABUSHIKI KAISHA, Toyota (JP); SUBARU CORPORATION, Tokyo (JP)

(72) Inventors: Marie Sakata, Toyota (JP); Masayuki Tado, Toyota (JP); Naoya Kidokoro, Shibuya-ku (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 356 days.

(21) Appl. No.: 17/371,614

(22) Filed: Jul. 9, 2021

(65) Prior Publication Data

US 2022/0063410 A1    Mar. 3, 2022

(30) Foreign Application Priority Data

Aug. 25, 2020  (JP) .................................. 2020-141725

(51) Int. Cl.
*B60K 37/02*    (2006.01)

(52) U.S. Cl.
CPC ........ *B60K 37/02* (2013.01); *B60K 2370/654* (2019.05); *B60K 2370/693* (2019.05); *B60K 2370/84* (2019.05)

(58) Field of Classification Search
CPC .............. B60K 37/02; B60K 2370/654; B60K 2370/693; B60K 2370/84; B60K 35/00; B60K 37/04; B62D 25/14
USPC .......................................................... 296/70
See application file for complete search history.

(56) References Cited

U.S. PATENT DOCUMENTS

| | | | | |
|---|---|---|---|---|
| 4,194,587 | A * | 3/1980 | Shino ..................... | B60K 37/02 180/90 |
| 11,285,811 | B2 * | 3/2022 | Kimura .................. | G01D 11/28 |
| 11,673,598 | B2 * | 6/2023 | Nakajima ............... | B62D 1/04 280/779 |

(Continued)

FOREIGN PATENT DOCUMENTS

| JP | S56-075030 U | 6/1981 |
|---|---|---|
| JP | H01-062131 U | 4/1989 |

(Continued)

OTHER PUBLICATIONS

English Translation of the May 9, 2023 Office Action issued in Japanese Patent Application No. 2020-141725.

*Primary Examiner* — Jason S Morrow
(74) *Attorney, Agent, or Firm* — Oliff PLC

(57) ABSTRACT

A structure of a vehicle body disclosed herein may include: an instrument panel; a steering column extending through an opening of the instrument panel toward a rear of the vehicle body, and having a steering wheel attached thereto; and a meter cluster panel provided such that the meter cluster panel surrounds a meter. The meter cluster panel may include: an upper cover portion provided such that the upper cover portion opposes at least a part of an upper portion of the meter; and a side cover portion provided such that the side cover portion opposes at least a part of a side portion of the meter. The side cover portion may extend from a position opposing the side portion of the meter toward the rear of the vehicle body and include a portion located closer to the rear of the vehicle body than the upper cover portion.

4 Claims, 3 Drawing Sheets

(56) References Cited

U.S. PATENT DOCUMENTS

2009/0261612 A1    10/2009   Takayama et al.

FOREIGN PATENT DOCUMENTS

| JP | H01-140727 U |   | 9/1989  |
|----|--------------|---|---------|
| JP | H03-096925 U |   | 10/1991 |
| JP | 2009-262637 A |  | 11/2009 |
| JP | 2011-162102 A |  | 8/2011  |
| JP | 2018-122658 A |  | 8/2018  |
| JP | 2019182208 A | * | 10/2019 |
| JP | 2021079777 A | * | 5/2021  |

* cited by examiner

STRUCTURE OF VEHICLE BODY

CROSS-REFERENCE TO RELATED APPLICATION

This application claims priority to Japanese Patent Application No. 2020-141725 filed on Aug. 25, 2020, the contents of which are hereby incorporated by reference into the present application.

TECHNICAL FIELD

The technique disclosed herein relates to a structure of a vehicle body.

BACKGROUND

A structure of a vehicle body includes: an instrument panel; a steering column extending through an opening of the instrument panel toward a rear of the vehicle body, and having a steering wheel attached thereto; and a meter cluster panel provided such that the meter cluster panel surrounds a meter. The meter cluster panel is attached to an upper surface of the instrument panel and disposed frontward of the steering wheel. Japanese Patent Application Publication No. 2009-262637 describes an example of such a structure of the vehicle body.

SUMMARY

If a meter cluster panel is attached to an upper surface of an instrument panel, a large area of a meter is exposed to the interior of a cabin. This has a disadvantage that foreign material such as dust tends to stick to a surface of the meter.

A structure of a vehicle body disclosed herein may comprise: an instrument panel; a steering column extending through an opening of the instrument and toward a rear of the vehicle body, and having a steering wheel attached thereto; and a meter cluster panel provided such that the meter cluster panel surrounds a meter. The meter cluster panel is attached to an upper surface of the instrument panel and disposed frontward of the steering wheel. The meter cluster panel may comprise: an upper cover portion provided such that the upper cover portion opposes at least a part of an upper portion of the meter; and a side cover portion provided such that the side cover portion opposes at least a part of a side portion of the meter. The side cover portion extends from a position opposing the side portion of the meter toward the rear of the vehicle body and includes a portion located closer to the rear of the vehicle body than the upper cover portion.

In the above-described structure of the vehicle body, a surface of the meter is covered by the side cover portion when viewed from a lateral side of the meter cluster panel. Thereby, foreign material such as dust can be prevented from sticking to the surface of die meter.

DETAILED DESCRIPTION

Figure 1:
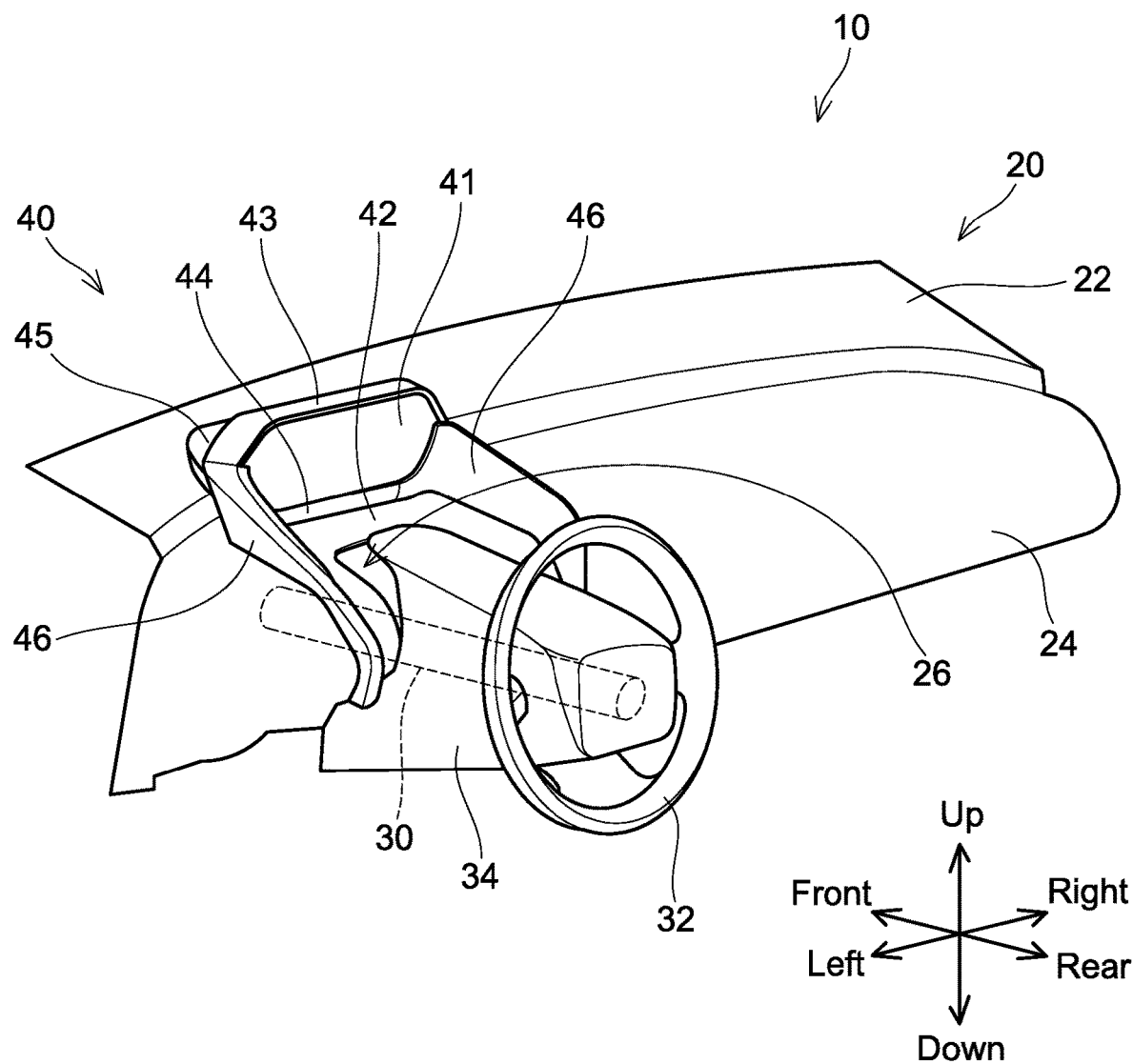
FIG. 1 schematically illustrates a perspective view of a stricture of a vehicle body.

A structure of a vehicle body disclosed herein may comprise: an instrument panel; a steering column extending through an opening of the instrument panel toward a rear of the vehicle body, and having a steering wheel attached thereto; and a meter duster panel provided such that the meter cluster panel surrounds a meter. The meter cluster panel is attached to an upper surface of the instrument panel and disposed frontward of the steering wheel. The meter cluster panel may comprise: an upper cover portion provided such that the upper cover portion opposes at least a part of an upper portion of the meter; and a side cover portion provided such that the side cover portion opposes at least a part of a side portion of the meter. The side cover portion extends from a position opposing the side portion of the meter toward the rear of the vehicle body and includes a portion located closer to the rear of the vehicle body than the upper cover portion. Here, the side cover portion may be constituted of a part opposing the side portion of the meter and a part extending from the side portion of the meter toward the rear of the vehicle which are integrally formed or configured as separate members. In addition, the upper cover portion and the side cover portion may be integrally formed, or configured as separate members.

In the above embodiment, the side cover portion may extend at least to a position adjacent to the opening of the instrument panel in a width direction of the vehicle body. According to such a configuration, the side cover portion extends such that the side cover portion sufficiently projects toward the rear of the vehicle from a position opposing the side portion of the meter. Thereby, a surface of the meter is well covered by the side cover portion when viewed from a lateral side of the meter cluster panel, and foreign material such as dust can thereby be well prevented from sticking to the surface of the meter.

In the above embodiment, the side cover portion may oppose at least a portion of the side portion of the meter corresponding to a lower half of the meter. According to such a configuration, a height of a part of the side cover portion extending toward the rear of the vehicle from the position opposing the side portion of the meter becomes high. Thereby, the surface of the meter is well covered by the side cover portion when viewed from the lateral side of the meter cluster panel, and foreign material such as dust can thereby be well prevented from sticking to the surface of the meter.

In the above embodiment, the meter cluster panel may further comprise a back cover portion provided such that the back cover portion opposes a back portion of the meter. A first edge portion of the back cover portion may be in contact with a second edge portion of the side cover portion. The back cover portion may comprise at least one first projection projecting from the first edge portion toward the second edge portion of the side cover portion in a front-rear direction of the vehicle body. The side cover portion may comprise at least one second projection projecting from the second edge portion toward the first edge portion of the hack cover portion in the front-rear direction of the vehicle body. The at least one first projection of the back cover portion may oppose an inner surface of the second edge portion of the side cover portion. The at least one second projection of the side cover portion may oppose an inner surface of the first edge portion of the back cover portion. According to such a configuration, relative movement of the hack cover portion and the side cover portion in the width direction can be curtailed. As a result, appearance of the meter cluster panel can be maintained even when, for example, significantly large vibration acts thereon.

In the above-described embodiment, the at least one first projection may comprise a plurality of first projections, the at least one second projection may comprise a plurality of second projections, the first projections may be arranged in a spaced arrangement in a vertical direction of the vehicle body, and the second projections may be arranged in a spaced arrangement in the vertical direction of the vehicle body. The plurality of first projections and the plurality of second projections may be alternately arranged in the vertical direction of the vehicle. According to such a configuration, relative movement of the back cover portion and the side cover portion in the width direction can be well curtailed.

Embodiment

Figure 2:
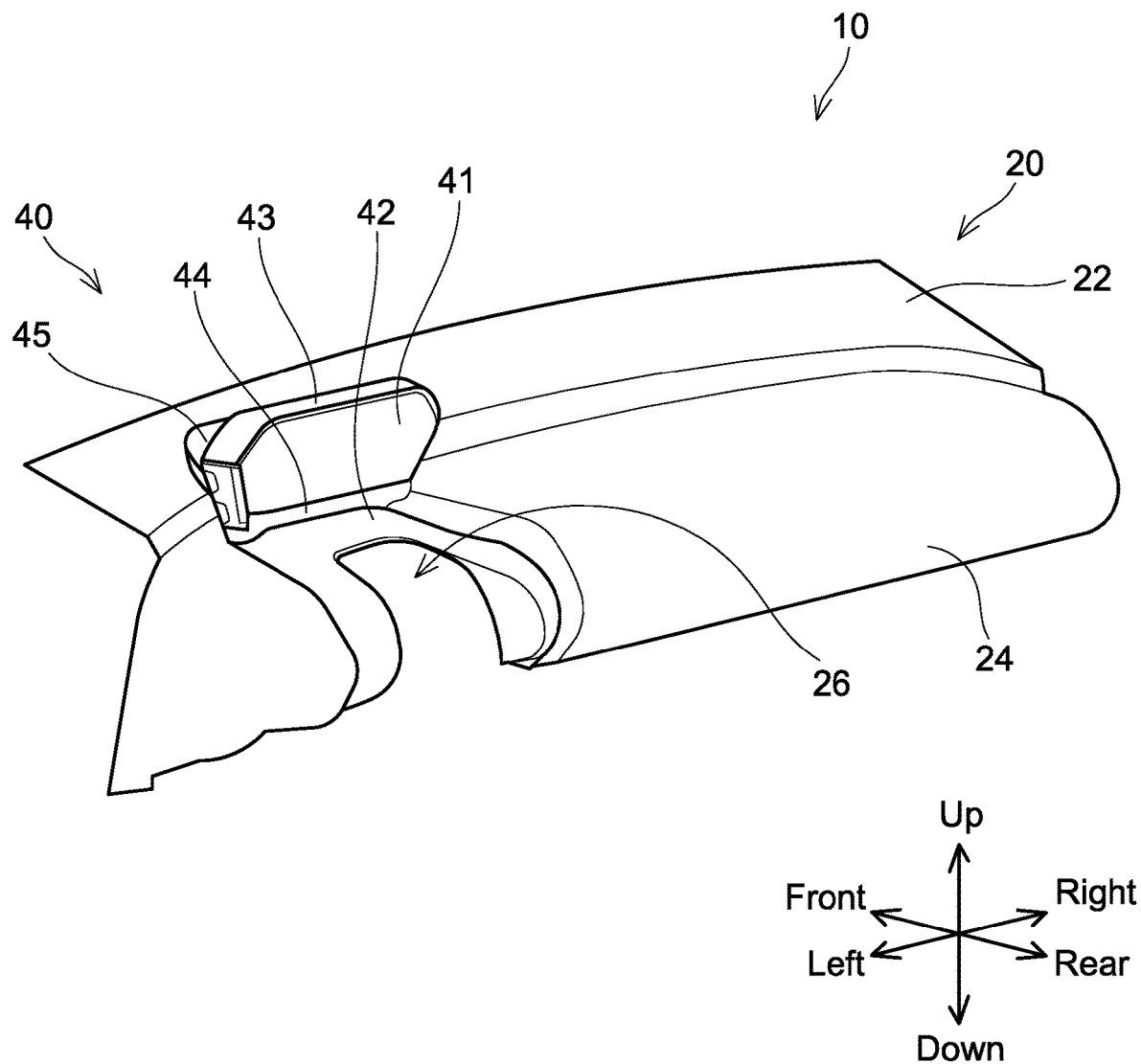
FIG. 2 schematically illustrates a perspective view of the structure of the vehicle body corresponding to FIG. 1, from which a steering column, a steering wheel, a column cover, and side cover portions of a meter cluster panel are omitted.

A structure 10 of a vehicle body, which is located frontward of an interior of a cabin with respect to a vehicle body, will be explained with reference to FIGS. 1 and 2. "Front" in the coordinate system illustrated in the drawings indicates a front side relative to a front-rear direction of the vehicle body, "Rear" in the coordinate system illustrated in the drawings indicates a rear side relative to the front-rear direction of the vehicle body, "Up" indicates an upper end relative to an up-down direction of the vehicle body, "Down" indicates a down end relative to the up-down direction of the vehicle body, "Left" indicates a left side relative to a width direction of the vehicle body as viewed from the rear of the vehicle body looking forward, and "Right" indicates a right side relative to the width direction of the vehicle body as viewed from the rear of the vehicle body looking forward. The structure 10 of the vehicle body includes an instrument panel 20, a steering column 30, and a meter cluster panel 40. It is noted that, in FIGS. 1 and 2, the instrument panel 20 and the steering column 30 are illustrated in a simplified manner for clear illustration, and illustrations of, for example, an air vent for conditioning air defined in the instrument panel 20, an opening for a center console, and mechanisms of the steering column 30 are omitted.

The instrument panel 20 is disposed frontward of the interior of the cabin with respect to the vehicle body, and extends in a width direction of the vehicle body. The instrument panel 20 includes a two-staged surface which is exposed to the interior of the cabin, and includes an instrument upper panel portion 22 that configures an upper step portion of the instrument panel 20 and an instrument lower panel portion 24 that configures a lower step portion of the instrument panel 20, although not particularly limited to this configuration. The instrument upper panel portion 22 is constituted of a substantially flat surface which is inclined downward from front to the rear of the vehicle body. The instrument lower panel portion 24 is constituted of a curved surface that curves from the front to the rear of the vehicle, and is convex toward the rear of the vehicle body.

The steering column 30 extends toward the rear of the vehicle body through an opening 26 defined in the instrument lower panel portion 24. A front end of the steering column 30 in its axial direction is inserted into the instrument panel 20. A rear end of the steering column 30 in its axial direction extends toward the interior of the cabin, and the steering wheel 32 is attached to an end thereof. Apart of the steering column 30 between the instrument panel 20 and the steering wheel 32 are covered such that it is surrounded by the column cover 34.

The meter cluster panel 40 is a cover member disposed to surround a meter 41. The meter 41 is a display configured to digitally display various measurement values (for example, a vehicle speed and rotation speed of an engine or a motor). The meter cluster panel 40 is attached to an upper surface of the instrument panel 20 and disposed frontward of the steering wheel 32, and includes a base panel portion 42, an upper cover portion 43, a lower cover portion 44, a back cover portion 45, and a pair of side cover portions 46.

The base panel portion 42 is fastened to the instrument lower panel portion 24 via fastener(s), and disposed to partially cover the opening 26 defined in the instrument lower panel portion 24. The base panel portion 42 is curved along a shape of the instrument lower panel portion 24, and is convex toward the rear of the vehicle body. It can be said that the base panel portion 42 constitutes a part of the instrument lower panel portion 24. Thus, it can be said that the opening 26 in the instrument lower panel portion 24 is an opening defined by the base panel portion 42.

The upper cover portion 43 is disposed to oppose a top portion of the meter 41, and covers the top portion of the meter 41. Although not particularly limited, the upper cover portion 43 extends in the width direction along a shape of the top portion of the meter 41, and its opposite ends are inclined downward. The upper cover portion 43 is connected to the back cover portion 45 and the pair of side cover portions 46.

The lower cover portion 44 is disposed to oppose a bottom portion of the meter 41, and covers the bottom portion of the meter 41. Although not particularly limited, the lower cover portion 44 extends in the width direction along a shape of the bottom portion of the meter 41. The lower cover portion 44 is connected to the meter 41 and the pair of side cover portions 46.

The back cover portion 45 is disposed to oppose a back portion of the meter 41 from the front of the vehicle body, and covers the back portion of the meter 41. Although not particularly limited, the back cover portion 45 is convex toward the front of the vehicle body. The back cover portion 45 is connected to the instrument upper panel portion 22, the upper cover portion 43, and the pair of side cover portions 46.

Each of the pair of side cover portions 46 is disposed to oppose its corresponding side portion of the meter 41, and covers the corresponding side portion of the meter 41. In addition, each of the pair of side cover portions 46 extends toward the rear of the vehicle from the position opposing the corresponding side portion of the meter 41, and includes a portion located closer to the rear of the vehicle body than the upper cover portion 43. Specifically, each of the side cover portions 46 extends at least to a position adjacent to the opening 26 defined in the instrument lower panel portion 24 in the width direction, and in addition, extends at least to a position adjacent to the column cover 34 in the width direction. As such, each of the pair of side cover portions 46 extends to sufficiently project toward the rear of the vehicle body from the position opposing the corresponding side portion of the meter 41. Although not particularly limited, each of the pair of side cover portions 46 is curved along a shape of the instrument lower panel portion 24, and is convex toward the rear of the vehicle body. In this example, each of the pair of side cover portions 46 is configured by an opposing portion opposing the corresponding side portion of the meter 41 and a projecting portion extending from the corresponding side portion of the meter 41 toward the rear of the vehicle body being integrally formed. Instead of this example, these portions may be configured as separate members.

A height of each of the pair of side cover portions 46 at the position opposing the corresponding side portion of the meter 41 is greater than or equal to half a height of the meter 41. In other words, with regard to each of the pair of the side cover portions 46, the opposing portion opposing the corresponding side portion of the meter 41 opposes at least a portion of the corresponding side portion of the meter 41 corresponding to a lower half of the meter 41. Each of the pair of side cover portions 46 is, at its projecting portion extending toward the rear of the vehicle body from the position opposing the corresponding side portion of the meter 41, configured such that its height continuously and gradually decreases toward the rear of the vehicle body. As described above, each of the pair of side cover portions 46 extends toward the rear of the vehicle body while the height of the part of the projecting portion proximate to the opposing portion opposing the side portion of the meter 41 is maintained to be approximately half the height of the meter 41.

As described above, in the structure 10 of the vehicle body of the present embodiment, the meter cluster panel 40 is attached to the upper surface of the instrument panel 20. In addition, each of the pair of side cover portions 46 of the meter cluster panel 40 includes a portion located closer to the rear of the vehicle body than the upper cover portion 43. As such, since the meter cluster panel 40 projects upward relative to the vehicle body from the upper surface of the instrument panel 20, visibility of the meter 41 is improved. In addition, since each of the pair of side cover portions 46 extends to sufficiently project toward the rear of the vehicle body, the surface of the meter 41 is covered by the side cover portions 46 when viewed from the lateral side of the meter cluster panel 40. Consequently, foreign material such as dust can be prevented from sticking to the surface of the meter 41. As such, according to the meter cluster panel 40 of the present embodiment, the visibility of the meter 41 can be improved and further the foreign material such as dust can be prevented from sticking the surface of the meter 41.

As with the structure 10 of the vehicle body of the present embodiment, in a certain type of vehicle body of which meter cluster panel 40 projects upward relative to the vehicle body from the upper surface of the instrument panel 20, a distance between the meter cluster panel 40 and a windshield is short, thereby a temperature of the meter 41 tends to adversely increase due to sunlight. In the structure 10 of the vehicle body of the present embodiment, however, since each of the pair of the side cover portions 46 extends to sufficiently project, toward the rear of the vehicle body, such an increase in the temperature of the meter 41 can be mitigated by dissipation of heat via the pair of side cover portions 46.

Figure 3:
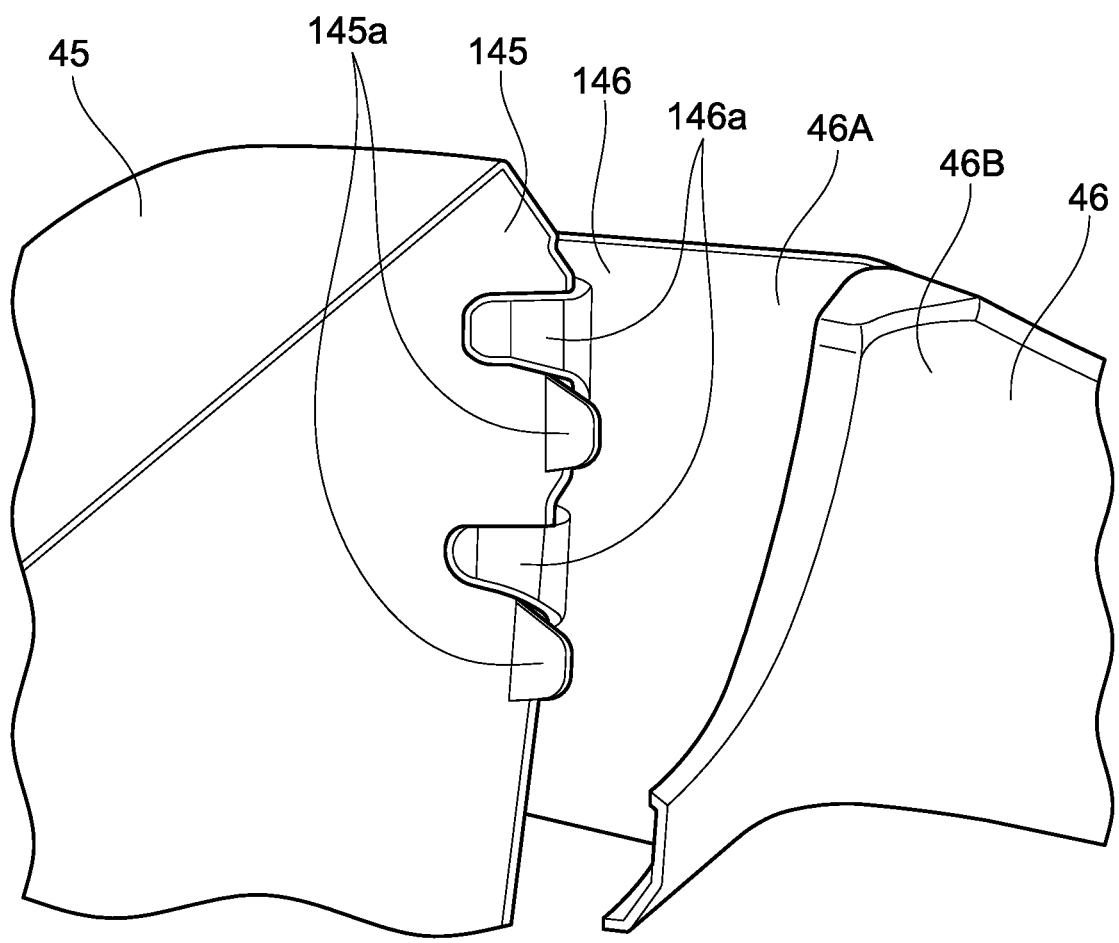
FIG. 3 illustrates a partial perspective view of the meter cluster panel.
Figure 3:
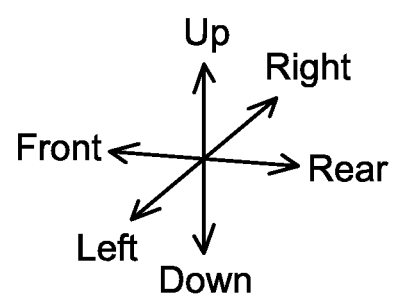

FIG. 3 illustrates a partial perspective view of the meter cluster panel 40. FIG. 3 illustrates a part where the back cover portion 45 and one of the side cover portions 46 joined to each other. It should be noted that the other of the side cover portions 46 has substantially the same configuration. As illustrated in FIG. 3, a first edge portion 145, which is positioned on one end side of the back cover portion 45 in the width direction, and a second edge portion 146, which is positioned on a front side of the side cover portion 46 in the front-rear direction, are joined to each other. A reference sign 46A in FIG. 3 is the opposing portion opposing one of the side portions of the meter 41, and a reference sign 4613 in FIG. 3 is the projecting portion extending from the side portion of the meter 41 toward the rear of the vehicle body.

The back cover portion 45 includes a plurality of first projections 145a projecting in the front-rear direction of the vehicle body from the first edge portion 145 toward the second edge portion 146 of the side cover portion 46. Each of the plurality of first projections 145a opposes an inner surface of the second edge portion 146 of the side cover portion 46, specifically, is in contact with the inner surface of the second edge portion 146 of the side cover portion 46, Here, "inner surface of the second edge portion 146 of the side cover portion 46" refers to a surface exposed toward a left side of the vehicle body, in one of the side cover portions 46 disposed on a right side of the vehicle body, and refers to a surface exposed toward the right side of the vehicle body in the other of the side cover portions 46 disposed on the left side of the vehicle.

The side cover portion 46 includes a plurality of second projections 146a projecting in the front-rear direction from the second edge portion 146 toward the first edge portion 145 of the back cover portion 45, Each of the plurality of second projections 146a opposes an inner surface of the first edge portion 145 of the back cover portion 45, specifically, is in contact with the inner surface of the first edge portion 145 of the back cover portion 45. Here, "inner surface of the first edge portion 145 of the back cover portion 45" refers to a surface exposed toward the back portion of the meter 41, and a surface that is not exposed to the interior of the cabin.

The plurality of first projections 145a is arranged in a spaced arrangement in a vertical direction of the vehicle body. The plurality of second projections 146a is also arranged in a spaced arrangement in the vertical direction of the vehicle body. The plurality of first projections 145a and the plurality of second projections 146a are alternately arranged in the vertical direction of the vehicle, and arranged to mesh with each other. As described above, neither of the plurality of first projections 145a nor the plurality of second projections 146a is exposed to the outside of the meter cluster panel 40, by which appearance of the meter cluster panel 40 is not degraded. A movement of the back cover portion 45 toward the right side of the vehicle body is restricted by the first projections 145a making contact with the side cover portion 46. A movement of the back cover portion 45 toward the left side of the vehicle body is restricted by the second projections 146a making contact with the back cover portion 45. Similarly, a movement of the side cover portion 46 toward the right side of the vehicle body is restricted by the second projections 146a making contact with the back cover portion 45. A movement of the side cover portion 46 toward the left side of the vehicle body is restricted by the first projections 145a making contact with the side cover portion 46. As above, the plurality of first projections 145a and the plurality of second projections 146a can well prevent relative movements of the back cover portion 45 and the side cover portion 46 in the width direction without degradation of the appearance of the meter cluster panel 40. As a result, the appearance of the meter cluster panel 40 can be maintained even when, for example, significantly large vibration acts thereon.

Specific examples of the present disclosure have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed.

Further, the art described in the description and the drawings may concurrently achieve a plurality of aims, and technical significance thereof resides in achieving any one of such aims.

What is claimed is:

1. A structure of a vehicle body comprising:
an instrument panel;
a steering column extending through an opening of the instrument panel toward a rear of the vehicle body, and having a steering wheel attached thereto; and
a meter cluster panel provided such that the meter cluster panel surrounds a meter, wherein
the meter cluster panel is attached to an upper surface of the instrument panel and disposed frontward of the steering wheel,
the meter cluster panel comprises:
an upper cover portion provided such that the upper cover portion opposes at least a part of an upper portion of the meter; and
a side cover portion provided such that the side cover portion opposes at least a part of a side portion of the meter,
the side cover portion extends from a position opposing the side portion of the meter toward the rear of the vehicle body and includes a portion located closer to the rear of the vehicle body than the upper cover portion,
the meter cluster panel further comprises a back cover portion provided such that the back cover portion opposes a back portion of the meter,
a first edge portion of the back cover portion is in contact with a second edge portion of the side cover portion,
the back cover portion comprises at least one first projection projecting from the first edge portion toward the second edge portion of the side cover portion in a front-rear direction of the vehicle body,
the side cover portion comprises at least one second projection projecting from the second edge portion toward the first edge portion of the back cover portion in the front-rear direction of the vehicle body,
the at least one first projection of the back cover portion opposes an inner surface of the second edge portion of the side cover portion, and
the at least one second projection of the side cover portion opposes an inner surface of the first edge portion of the back cover portion.

2. The structure according to claim 1, wherein
the side cover portion extends at least to a position adjacent to the opening of the instrument panel in a width direction of the vehicle body.

3. The structure according to claim 1, wherein
the side cover portion opposes at least a portion of the side portion of the meter corresponding to a lower half of the meter.

4. The structure according to claim 1, wherein
the at least one first projection comprises a plurality of first projections,
the at least one second projection comprises a plurality of second projections,
the first projections are arranged in a spaced arrangement in a vertical direction of the vehicle body,
the second projections are arranged in a spaced arrangement in the vertical direction of the vehicle body, and
the plurality of first projections and the plurality of second projections are alternately arranged in the vertical direction of the vehicle.

* * * * *